United States Patent [19]

Matsumura et al.

[11] Patent Number: 4,555,750
[45] Date of Patent: Nov. 26, 1985

[54] CONTROL APPARATUS FOR D.C. POWER TRANSMISSION SYSTEM

[75] Inventors: Susumu Matsumura, c/o Sohgo Gigyutsu Kenkyusho of Kansai Electric Power Company Incorporated, No. 1, Nakohji, Ichinotsubo, City of Amagasaki, Hyogo Pre, Japan; Yasuhiko Hosokawa, Kobe, Japan; Kanji Katsuki, Kobe, Japan; Masao Yano, Kobe, Japan

[73] Assignees: Susumu Matsumura, Amagasaki; Mitsubishi Denki Kabushiki Kaisha, Tokyo, both of Japan

[21] Appl. No.: 421,574

[22] Filed: Sep. 22, 1982

[30] Foreign Application Priority Data

Sep. 22, 1981 [JP] Japan .................................. 56-149890
Sep. 22, 1981 [JP] Japan .................................. 56-149891

[51] Int. Cl.[4] ............................................ H02M 5/45
[52] U.S. Cl. ....................................... 363/37; 363/51; 363/49; 363/87; 363/96
[58] Field of Search ........................ 363/34, 35, 37, 38, 363/51, 49, 85, 87, 96; 307/85, 86, 87, 82; 318/801

[56] References Cited

U.S. PATENT DOCUMENTS 3,470,442  9/1969  Ainsworth ............................ 363/35
3,543,129  11/1970  Boksjo ................................. 363/35
4,307,442  12/1981  Yano et al. .......................... 363/51

FOREIGN PATENT DOCUMENTS 1446039  8/1976  United Kingdom ................. 363/34

OTHER PUBLICATIONS

New Static VAR Control Using Force-Commutated Inverters, Yoshio Sumi et al., 1981 IEEE 81 WM 228-6, pp. 1-9, FIGS. 1,2 and 6.
Development and Field Experience of New Static VAR Supply and Control System Using Force-Commutated Inverters, Y. Harumoto et al., IEEE International Conference on "Thyristor and Variable Static Equipment for AC and DC Transmission", Nov. 30–Dec. 30, 1981, pp. 29–32, FIG. 1

Primary Examiner—William H. Beha, Jr.
Assistant Examiner—Jeffrey Sterrett
Attorney, Agent, or Firm—Wenderoth, Lind & Ponack

[57] ABSTRACT

This invention relates to an apparatus for controlling a D.C. power transmission system having a line-commutated converter which is connected between a first A.C. system and D.C. power transmission lines and which performs power conversion between A.C. power and D.C. power, and a forced-commutated converter which is connected between the D.C. power transmission lines and having a second A.C. system and which performs power conversion between A.C. power and D.C. power. In order to control transmission power in the two-terminal D.C. power transmission system wherein the two A.C. systems are associated by direct current, a control apparatus for a D.C. power transmission system according to this invention includes a voltage detector which detects a D.C. voltage of the D.C. power transmission lines, a first control circuit for comparing the output of the voltage detector with a voltage reference signal and for controlling ignition of the self-excited converter in accordance with the comparison, a detector which detects a current which is proportional to the conversion power of the line-commutated converter, and a second control circuit for comparing the output of the current detector with a power reference signal and for controlling ignition of the line-commutated converter in accordance with the comparison.

5 Claims, 6 Drawing Figures

CONTROL APPARATUS FOR D.C. POWER TRANSMISSION SYSTEM

BACKGROUND OF THE INVENTION

This invention relates to a method of controlling transmission power in a two-terminal D.C. power transmission system wherein two A.C. systems are associated by a direct current. More specifically, it relates to a control apparatus for a D.C. power transmission system wherein one of converters is a line-commutated converter and the other is a forced-commutated converter.

A D.C. power transmission system to which this invention is applied is constructed as shown in FIG. 1. Referring to the figure, numeral 1 designates a first A.C. system; numeral 2 designates a second A.C. system, and numeral 3 designates a line-commutated converter which is connected to the first A.C. system 1 and which changes alternating current into direct current. Shown at numeral 4 is a force-commutated converter which has a commutation means therein, and which is connected to the second A.C. system 2 through a reactance 5. Numeral 6 indicates a D.C. power transmission line which is connected between the D.C. terminal of the line-commutated converter 3 and that of the forced-commutated converter 4, and numeral 7 designates a smoothing capacitor which is connected to the D.C. terminals of the forced-commutated converter 4.

As a method of controlling the D.C. power transmission system, there has been known one method relying on the control means 13 to 15. Numeral 10 denotes a voltage detector which detects a D.C. voltage across the smoothing capacitor 7, numeral 11 designates a voltage reference generator which provides a reference voltage, and numeral 12 designates a voltage controller which takes the difference between the reference voltage and the detected D.C. voltage and which changes the ignition pulse phase of the line-commutated converter 3 on the basis of deviations in the difference and thus controls same so as to render the deviations equal to zero. The control means 13 is a power detector which detects the effective power that is exchanged between the second A.C. system 2 and the forced-commutated converter 4 through the reactance 5, the control means 14 is a power reference generator which provides a reference of the transmission power of the D.C. power transmission system, and the control means 15 is a power controller which takes the difference between the reference power and the effective power and which changes the ignition pulse phase of the forced-commutated converter 4 on the basis of the difference and thus controls same so as to render the difference equal to zero. In operation, when the reference voltage has been provided by the voltage reference generator 11, it is compared with the D.C. voltage detected by the voltage detector 10, and the voltage controller 12 changes the control angle of the ignition pulse of the line-commutated converter 3. When the D.C. voltage is lower, the control angle is advanced, and when it is higher, the control angle is retarded, whereby the voltage between the D.C. terminals of the line-commutated converter 3 is raised or lowered. As a result, charges are stored into or discharged from the smoothing capacitor 7 through the D.C. power transmission lines 6, and the D.C. voltage is controlled so as to agree with the voltage reference. On the other hand, the forced-commutated converter 4 changes this D.C. voltage into an alternating current. A voltage of a magnitude proportional to the D.C. voltage is generated at the A.C. terminal of the converter 4, and its phase is determined by the ignition pulse phase of this converter. Subsequently, when the reference power has been provided by the power reference generator 14, it is compared with the effective power detected by the power detector 13, and the power controller 15 changes the phase of the ignition pulse of the forced-commutated converter 4. When the power detected by the power detector 13 is smaller than the reference, the phase of the ignition pulse is advanced. As a result, the phase of a voltage occurring at the A.C. terminal of the converter 4 changes into a phase leading over the voltage phase of the A.C. system 2, and the phase angle difference increases the quantity of power to flow to the A.C. system 2 through the reactance 5. Conversely, when the power detected by the power detector 13 is greater than the reference, the phase of the ignition pulse is retarded. As a result, the phase of a voltage occurring at the A.C. terminal of the converter 4 changes into a phase lagging behind the voltage phase of the A.C. system 2, and the phase angle difference decreases the quantity of power. Thus, the transmission power is controlled so as to become equal to the power reference.

With the control method stated above, after the voltage of the smoothing capacitor 7 has been detected by the voltage detector 10, this information needs to be transmitted to the control part for the converter 3 on the first A.C. system side. Furthermore, since the two converters 3 and 4 are actually located a long distance apart, there is the disadvantage that the controllability is worsened by a transmission lag and noise in the course of transmission. Besides, since the voltage of the smoothing capacitor 7 is regulated by changing the voltage of the converter 3, there is the disadvantage that a control lag is incurred by the inductance of the transmission lines existing midway, resulting in a slow response.

SUMMARY OF THE INVENTION

This invention has been made in order to eliminate the disadvantages mentioned above, and has for its object to provide a control method in which control information and controlled variables in both converting stations which are respectively separated, to thereby make the transmission thereof unnecessary, so that the control lag can be obviated.

DESCRIPTION OF THE PREFERRED EMBODIMENTS

Figure 1:
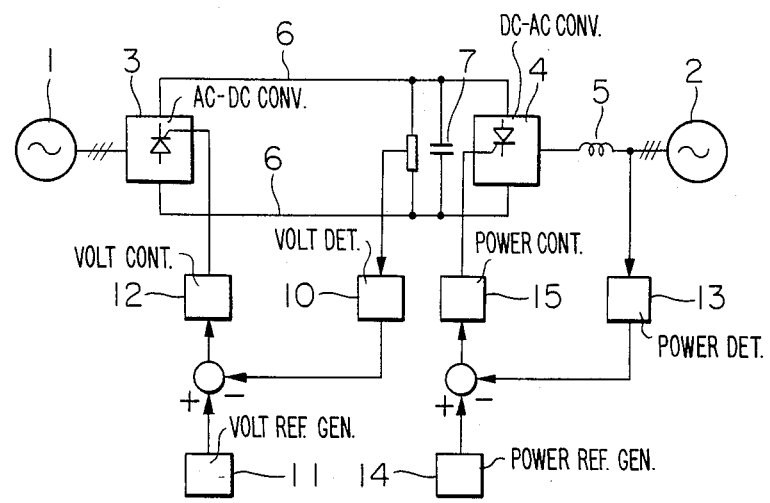
FIG. 1 is a block diagram showing a D.C. power transmission system to which this invention is applicable.
Figure 2:
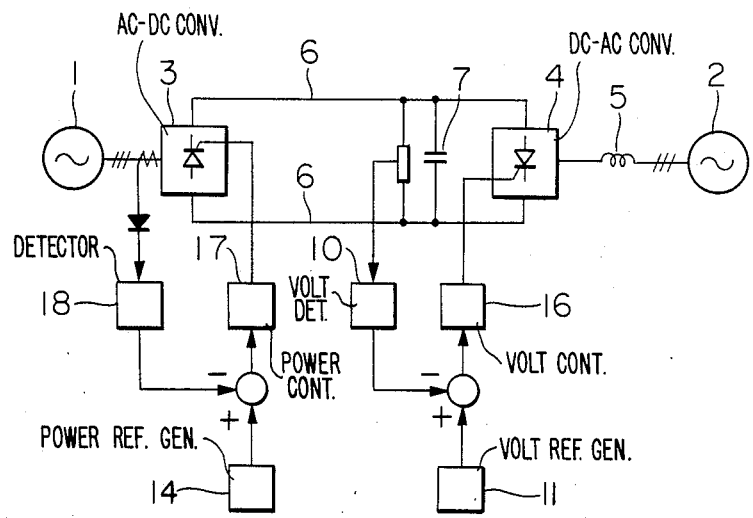
FIG. 2 is a block diagram showing a control method according to an embodiment of this invention.

Now, an embodiment of this invention will be described with reference to the drawing. In FIG. 2, numerals 1 to 7 indicate the same constituents as in FIG. 1. The voltage reference generator 11, the power reference generator 14 and the voltage detector 10 are also the same as in FIG. 1. Numeral 16 designates a first control means for changing the phase angle difference between the A.C. voltage generated by the forced-commutated converter 4 and the voltage of the second A.C. system 2, on the basis of the difference between the output of the voltage detector 10 and that of the voltage reference generator 11. On the other hand, numeral 18 designates a detector which detects the conversion power of the converter 3 by detecting the current flowing from the first A.C. system 1 into the separately-excited converter 3, and numeral 17 designates second control means for changing the ignition phase of the separately-excited converter 3 on the basis of the difference between the output of the power reference generator 14 and that of the detector 18.

The arrangement of FIG. 2 operates as follows. The voltage reference generator 11 generates a reference for controlling the voltage of the smoothing capacitor 7 so as to be at a predetermined value. This reference is compared to the voltage value detected by the voltage detector 10, and the voltage difference therebetween is applied to the first control means 16 as an input signal. The first control means 16 changes the ignition pulse phase of the forced-commutated converter 4 on the basis of the voltage difference. When the voltage value across the smoothing capacitor 7 is smaller than the predetermined value, the ignition pulse phase of the converter 4 is shifted in the lagging direction, with the result that the A.C. voltage occurring at the A.C. terminal of the converter 4 lags in phase with respect to the voltage of the system 2. Owing to the consequent phase angle difference between both the ends of the reactance 5, power flows from the system 2 toward the converter 4, so that the smoothing capacitor 7 is charged so as to raise the terminal voltage thereof. Conversely, when the voltage value across the smoothing capacitor 7 is greater than the predetermined value, the first control means 16 functions so as to shift the ignition pulse phase of the forced-commutated converter 4 in the leading direction. As a result, the A.C. voltage occurring at the A.C. terminal of the converter 4 leads in phase with respect to the voltage of the system 2. Owing to the consequent phase angle difference between both the ends of the reactance 5, power flows from the converter 4 toward the system 2, and a portion of the charges within the smoothing capacitor 7 is discharged so as to lower the voltage thereof. In this way, the voltage of the smoothing capacitor 7 is held at the predetermined value.

On the other hand, the power reference generator 14 generates the reference of the quantity of power to be transmitted through the D.C. power transmission lines 6. The detector 18 detects the conversion power of the converter 3 by rectifying the current flowing to the A.C. terminal of the converter 3 and thus detects the current flowing through the D.C. power transmission lines 6. This current (which is proportional to the D.C. power) and the reference of power are compared, and the difference therebetween is applied to the second control means 17 as an input signal On the basis of this deviation, the second control means 17 changes the ignition pulse phase of the separately-excited converter 3. When the current value detected by the detector 18 is smaller than the predetermined power reference, the ignition pulse of the converter 3 is shifted in the leading direction. As a result, the voltage between the D.C. terminals of the converter 3 increases, and the current to flow through the line 6 from the converter 3 toward the converter 4 increases. Conversely, when the current value detected by the detector 18 is greater than the predetermined power reference, the ignition pulse of the converter 3 is shifted in the lagging direction. As a result, the voltage between the D.C. terminals of the converter 3 decreases, and the current to flow through the line 6 from the converter 3 toward the converter 4 decreases. Since the transmission power through the lines 6 is equal to the product of the voltage across the smoothing capacitor 7 and the current through the D.C. power transmission lines 6, it is proportional to the current through the lines 6 in this control method in which the voltage across the capacitor 7 is held at a constant predetermined value. Accordingly, the transmission power is controlled to be at a predetermined value because the current through the lines 6 is controlled to be at a predetermined value by the foregoing process.

While, in this embodiment, the current through the D.C. power transmission lines 6 detected by the detector 18 is compared with the reference of power generated by the power reference generator 14, no problem is incurred even when the current through the lines 6 is directly detected. A similar effect is achieved even when the power of the system 1 is directly detected by a detector corresponding to the power reference, or when the power is detected by taking the product of the D.C. voltage of the converter 3 and the direct current of the lines 6 and is compared with the power reference.

As described above, according to this invention, the controls of both of the converting stations can be separately performed. Therefore, the transmission of control information becomes unnecessary, which brings forth the effect that the apparatus becomes simple in construction and high in reliability.

Moreover, since the voltage control of the smoothing capacitor 7 is executed without passing through the power transmission lines 6, the control lag can be obviated, which brings forth the effect that the control is quick in response.

Figure 3:
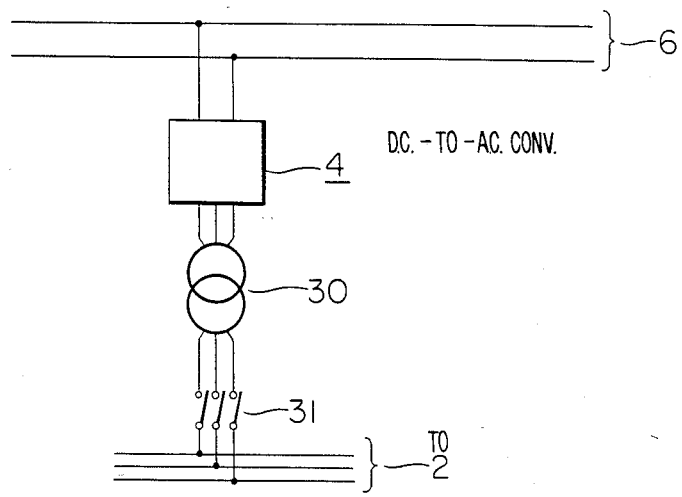
FIG. 3 is a constructional diagram showing an example of a converting station.
Figure 4:
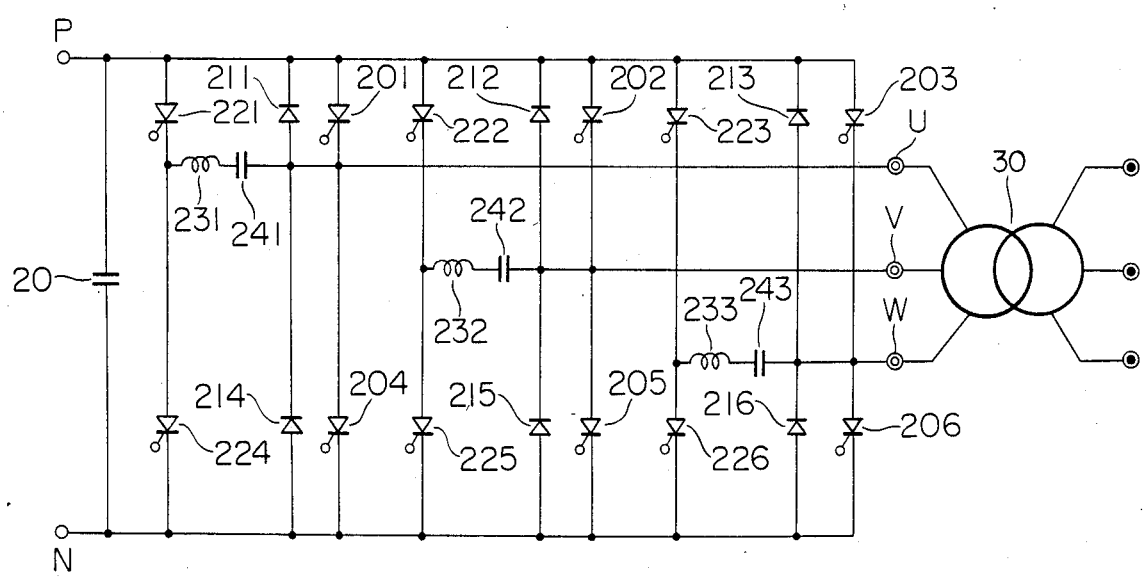
FIG. 4 is a constructional diagram showing an example of a forced-commutated converter.

Now, the converter 4 in FIGS. 1 and 2 will be described. The D.C.-to-A.C. converting station, in which the D.C. system and the A.C. system are associated, is constructed as shown in FIG. 3. Referring to the figure, numeral 6 indicates the power transmission lines of the D.C. system; numeral 4 designates the converter which is connected to the D.C. system; numeral 30 designates a transformer which is connected on the A.C. side of the converter 4, and numeral 31 designates switches which serve to connect the transformer 30 to the A.C. system 2. The converter 4 is the so-called "forced-commutated converter" which is constructed of switches having a forced commutation capability, and which is set up as shown in FIG. 4 by way of example. In FIG. 4, letters P and N denote D.C. terminals, which are connected to the D.C. power transmission lines 6. Numeral 20 designates a smoothing capacitor connected across the D.C. terminals; numerals 201, 202, 203, 204, 205 and 206 designate main thyristors; numerals 221, 222, 223, 224, 225 and 226 designate auxiliary thyristors;

numerals 211, 212, 213, 214, 215 and 216 designate flywheel diodes; numerals 231, 232 and 233 designate commutating reactors; and numerals 241, 242 and 243 designate commutating capacitors. The main thyristors (in pairs) are connected in series, and A.C. output terminals U, V and W are led out from the intermediate points of the pairs of main thyristors. The A.C. output terminals are connected to the transformer 30.

In starting the forced-commutated converter as described above, a method is employed in which the smoothing capacitor 20 is charged to a predetermined value by a separate power source (not shown), whereupon conduction signals are applied to the thyristors in a predetermined sequence. When the conduction signals have been applied to the thyristors, A.C. voltages of a magnitude proportional to the D.C. voltage value of the smoothing capacitor 20 are generated at the A.C. output terminals U, V and W of the converter. It is known that, for this reason, a high exciting current, called a rush current, flows to the output transformer 30. Since the exciting current flows through the main thyristors of the converter 4, the required current capacity of the converter increases and the size thereof enlarges. It is therefore necessary to suppress the rush current at the starting to the utmost. The rush current is increased when the voltage applied to the transformer is increased. Therefore, in the self-excited converter having the output transformer on the A.C. output side, a starting system is employed wherein the converter is started in a state of a lowered D.C. voltage and wherein the voltage applied to the transformer is restrained so as to have a small value at first and is gradually increased in order to suppress the rush current of the output transformer at the starting. In the forced-commutated converter connected to the D.C. power transmission lines, however, the voltage of the D.C. power transmission lines directly becomes the D.C. voltage of the converter as illustrated in FIG. 3, so that the starting method described above cannot be employed. This leads to the disadvantage that excess currents flow to the arms of the converter at the starting.

Figure 5:
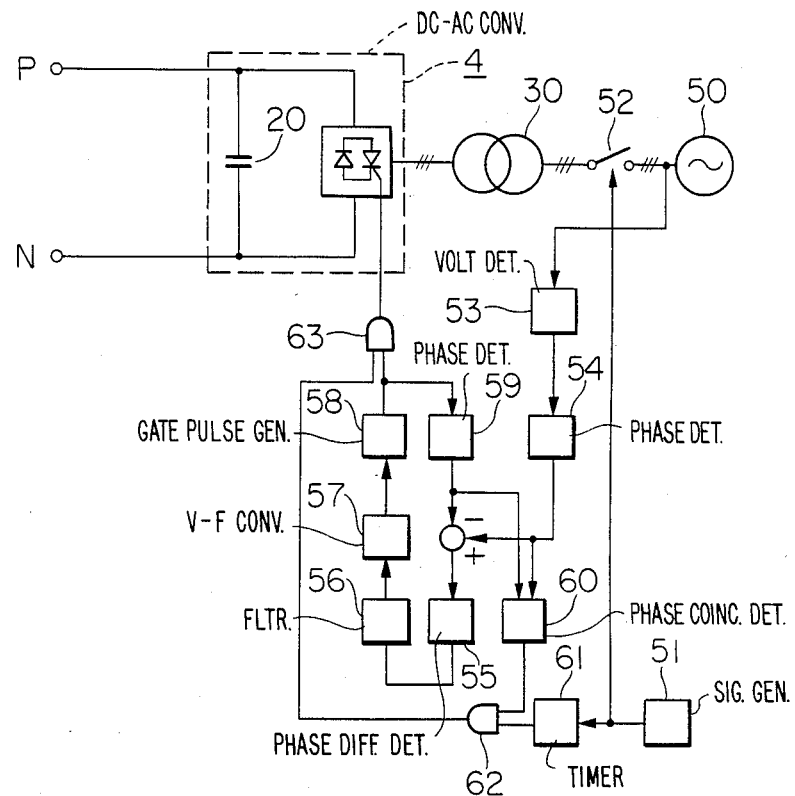
FIG. 5 is a constructional block diagram showing an embodiment of a starter for a converter according to this invention.

A starter in FIG. 5 has been contrived in order to eliminate this disadvantage. Referring to the figure, numeral 50 indicates an A.C. system. Numeral 51 indicates a starting signal generator, which gives a breaker 52 a closure command. Numeral 53 designates a detector which detects the voltage of the A.C. system 50; numeral 54 designates a phase detector which detects the phase of the aforementioned voltage; numeral 55 designates a phase difference detector which compares the voltage phase on the A.C. system side and the gate pulse phase of the converter so as to detect the difference between them; numeral 50 designates a filter which converts the output signal of the phase difference detector into a D.C. voltage; numeral 57 designates a voltage-to-frequency converter which converts the output voltage of the filter into a frequency; numeral 58 designates a gate pulse generator which divides the output frequency of the converter 57 so as to produce the gate pulses for the respective thyristors of the converter, and numerals 59 designates a phase detector which detects the phases of the gate pulses. A loop consisting of the constituents 55, 56, 57, 58 and 59 forms a phase locked loop. The expression "phase locked loop" signifies a circuit which generates a pulse synchronous with the phase of an input pulse, and an example of which is described by S. C. Gupta in 'Phase Locked Loop' Proc. IEEE vol. 63, No. 2, p. 291 (1975).

Numeral 60 designates a phase coincidence detector which provides an output when the outputs of the two phase detectors 54 and 59 are coincident and numeral 61 designates a timer which generates an output after a prescribed time from the issuance of the closure signal to the breaker 52. An AND logic circuit 62 provides an output when both the timer 61 and the phase coincidence detector 60 have provided their outputs. An AND logic circuit 63 supplies the respective thyristors with the gate pulses generated from the gate pulse generator 58, only when the output of the AND logic circuit 62 has been provided, and it blocks the gate pulses when no output is provided from the circuit 62.

Figure 6:
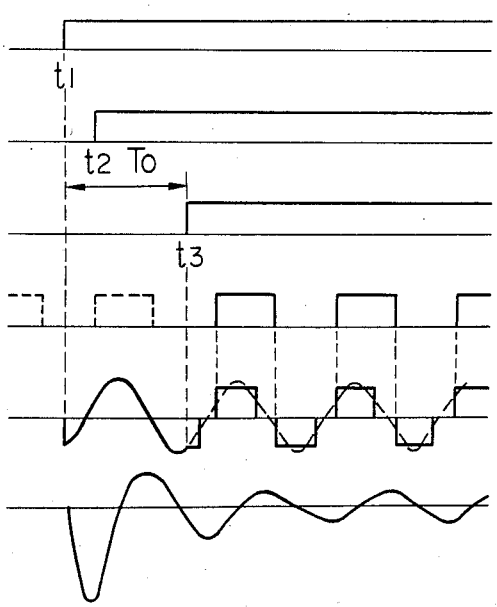
FIG. 6 is a time chart of this invention at starting by the starter.

The arrangement of FIG. 5 operates as follows. Before the starting signal is applied, the voltage phase of the A.C. system is detected by the detectors 53 and 54, and this phase and the gate pulse phase detected by the detector 59 are compared by the detector 55. When the phase detected by the detector 59 lags behind the phase detected by the detector 54, the output of the circuit 55 increases, with the result that the D.C. output voltage of the filter 56 increases so as to increase the oscillation frequency of the converter 57. In consequence thereof, the frequency of the gate pulses which are generated by the generator 58 increases, and the gate pulse phase which is detected by the detector 59 leads. Conversely, when the phase detected by the detector 59 leads over the phase detected by the detector 54, the output of the detector diminishes, with the result that the D.C. output voltage of the filter 56 diminishes so as to decrease the oscillation frequency of the converter 57. In consequence, the frequency of the gate pulses which are generated by the generator 58 lowers, and the gate pulse phase which is detected by the detector 59 lags. In this manner, due to the function of the phase locked loop comprising elements 55 to 59, the frequency of the converter 57 is determined so that the detection phase of the detector 54 and the detection phase of the detector 59 may agree at all times. As a result, the gate pulse phases are synchronized so that when the gate pulses are impressed on the respective thyristors of the converter 4 by the generator 58, a voltage which is in phase with the A.C. system 50 may be generated in the winding on the A.C. system side 2. Since, however, no signal comes from the AND logic circuit 62, the gate pulses are blocked by the AND logic circuit 63. When, under this state, the closure command of the breaker 52 is issued by the generator 51, the starting is effected as shown in FIG. 6. In FIG. 6, a time $t_1$ indicates the point of time at which the closure command has been given from the generator 51 to the breaker 52. Upon receiving this closure command, the timer 61 generates its output at the point of time $t_3$ which is later than $t_1$ by a predetermined time interval $(T_o)$, the above output being applied to the AND logic circuit 62. The circuit 62 is supplied with this signal and the output of the detector 60. The detector 60 is checking if the phases of the detectors 54 and 59 agree owing to the normal operation of the phase locked loop, and it provides its output when they agree. In FIG. 6, it is assumed that the synchronization is completed at a point of time $t_2$. At the time $t_3$, accordingly, both the inputs of the AND logic circuit 62 are applied, so that the circuit 62 provides its output and unblocks the gate pulses at the time $t_3$. After the time $t_3$, consequently, the gate pulses produced by the generator 58 are impressed on the respective thyristors of the converter 4 as they are. For example, the gate pulses of the main thyristor 201 of the U-phase in FIG. 4 are as shown in FIG. 6. The parts of the waveform shown as broken lines are issued from the generator 58 but are blocked by the AND logic circuit 63, and the parts of the waveform shown as solid lines are applied to the thyristors. Consequently, the line voltage between the U- and V-phases of the system 2 is directly applied during the period from $t_1$ to $t_3$, and the output voltage of the converter 4 is applied since $t_3$, as illustrated in FIG. 6. The exciting current of the transformer 30 is great at first when the voltage is applied to this transformer, but it thereafter decreases to soon become a steady value. The first excess current (the so-called rush current) flows in from the system 50 through the breaker 52, and only the charging current of the smoothing capacitor 20 flows because the converter 4 is blocked. This current flows via the flywheel diodes. When the gate pulse is applied to the thyristor at $t_3$, the exciting current of the system 2 has already reached the steady value. It is accordingly unnecessary to supply excess exciting current from the converter.

While, in the above embodiment, the converter 4 is a 6-phase converter, it may well be a multiple converter of the type wherein a plurality of 6-phase converter outputs are added by an output converter. It is needless to say that, in this case, the multiple converter corresponds to the output converter 30 in the present invention.

While the embodiment of FIG. 5 is so constructed as to determined the starting time by means of the timer 61, an operating command may well be given to the circuit 62 from another circuit in place of the timer. In this case, the starter is in the so-called standby state during the period from the closure of the breaker 52 to the entry of the operating command, and the converter does not operate in the state. This state can be made the floating state under which the converter is permitted to start as soon as the operating command enters.

As apparent from the above description, the rush current of the transformer for the converter need not be supplied from the converter side, so that the excess current at the starting of the converter is avoidable. As a further effect, since the charging of the smoothing capacitor is performed from the A.C. system through the output transformer, it becomes unnecessary to charge the smoothing capacitor from another power source before the starting, and the apparatus can start and stand by alone even in the absence of any other power source.

What is claimed is:

1. In an apparatus for controlling a D.C. power transmission system having a line-commutated converter which is connected between a first A.C. system and D.C. power transmission lines and which performs power conversion between A.C. power and D.C. power, and also having a forced-commutated converter which is connected between said D.C. power transmission lines and a second A.C. system and which performs power conversion between D.C. power and A.C. power; a control apparatus for a D.C. power transmission system comprising a voltage detector which detects a D.C. voltage of said D.C. power transmission lines, a first control means for comparing an output of said voltage detector with a voltage reference signal and for controlling ignition of said forced-commutated converter in accordance with said comparison, a current detector which detects a current proportional to a conversion power of said line-commutated converter, and a second control means for comparing an output of said current detection with a power reference signal and for controlling ignition of said line-commutated converted in accordance with said comparison, whereby said two converters may be remotely located from each other and electrically connected by only a D.C. transmission line since a separate feedback wire is not required between said first and second control means.

2. A control apparatus for a D.C. power transmission system as defined in claim 1, wherein said current detector detects a current on an A.C. side of said line-commutated converter.

3. A control apparatus for a D.C. power transmission system as defined in claim 1, wherein said current detector detects a current proportional to an effective power on an A.C. side of said line-commutated converter.

4. A control apparatus for a D.C. power transmission system as defined in claim 1, wherein said current detector detects a current proportional to a direct current of said line-commutated converter.

5. In an apparatus for starting a forced-commutated converter which is disposed between D.C. power transmission lines and a transformer connected to an A.C. system through a breaker and which performs power conversion between D.C. power and A.C. power; a starter for a D.C.-to-A.C. converter comprising a phase detector which detects a voltage phase of said A.C. system, a phase coincidence detector which detects a phase difference between a detected phase of said phase detector and a phase of a gate pulse and for controlling ignition of said converter so that said detected phase difference is not greater than a prescribed value, a timer circuit which provides an output upon lapse of a predetermined time after a closure signal for said breaker has been generated by a generating means, and a circuit which impresses said gate pulse on said converter when said timer circuit and said phase coincidence detector have simultaneously provided outputs therefrom.

* * * * *